(12) United States Patent
Sedoni et al.

(10) Patent No.: US 9,038,755 B2
(45) Date of Patent: May 26, 2015

(54) AGRICULTURAL VEHICLE

(75) Inventors: Enrico Sedoni, Modena (IT); Roberto Ferrari, Reggio Emilia (IT); Riccardo Morselli, Modena (IT); Riccardo Spadoni, Forli (IT)

(73) Assignee: CNH Industrial America LLC, New Holland, PA (US)

( * ) Notice: Subject to any disclaimer, the term of this patent is extended or adjusted under 35 U.S.C. 154(b) by 476 days.

(21) Appl. No.: 13/119,175

(22) PCT Filed: Sep. 15, 2009

(86) PCT No.: PCT/EP2009/061956
§ 371 (c)(1),
(2), (4) Date: Jun. 29, 2011

(87) PCT Pub. No.: WO2010/031771
PCT Pub. Date: Mar. 25, 2010

(65) Prior Publication Data
US 2011/0253466 A1    Oct. 20, 2011

(30) Foreign Application Priority Data

Sep. 16, 2008    (IT) .............................. BO2008A0566

(51) Int. Cl.
| *B60K 3/04* | (2006.01) |
| *H01M 8/00* | (2006.01) |
| *B60K 6/32* | (2007.10) |
| *B60K 6/30* | (2007.10) |
| *B60K 6/20* | (2007.10) |

(52) U.S. Cl.
CPC . *H01M 8/00* (2013.01); *B60K 3/04* (2013.01); *B60K 6/30* (2013.01); *B60K 6/20* (2013.01); *B60K 6/32* (2013.01); *H01M 2250/20* (2013.01); *Y02E 60/50* (2013.01); *Y02T 90/32* (2013.01)

(58) Field of Classification Search
CPC .............. B60K 3/04; B60K 6/20; B60K 6/30; B60K 6/32
USPC .............. 180/65.1, 65.21, 65.245, 65.31, 302
See application file for complete search history.

(56) References Cited

U.S. PATENT DOCUMENTS

| 6,625,539 B1* | 9/2003 | Kittell et al. ................. 701/29.3 |
| 6,628,006 B2* | 9/2003 | Oglesby et al. ................. 290/52 |
| 2005/0212281 A1* | 9/2005 | Gore et al. .................... 280/837 |
| 2007/0215397 A1* | 9/2007 | Suzuki .......................... 180/65.3 |
| 2008/0264094 A1* | 10/2008 | Campagna et al. ............. 62/402 |
| 2008/0283316 A1* | 11/2008 | Ono et al. ..................... 180/68.5 |

* cited by examiner

*Primary Examiner* — Hau Phan
*Assistant Examiner* — Bryan Evans
(74) *Attorney, Agent, or Firm* — Sue C. Watson; Patrick M. Sheldrake

(57) ABSTRACT

An agricultural vehicle comprises front and rear axle assemblies supported in mutually spaced relation by one or more vehicle frame members that also support a drive train comprising:
  a) one or more air compressors;
  b) one or more fuel sources;
  c) a fuel cell comprising one or more fuel cell modules; and
  d) one or more electric motors,
that are operatively connected together. The air compressor feeds air to the fuel cell, the or each fuel source feeds fuel to the fuel cell and the electric motors are connected or connectable to the fuel cell such that electrical power generated during operation of the fuel cell causes activation of one or more of the motors to power the vehicle.

17 Claims, 5 Drawing Sheets

AGRICULTURAL VEHICLE

This application is the U.S. National Stage application filed under 35 U.S.C. 365 and claiming priority to International Application Serial No. PCT/EP2009/061956, which was filed Sep. 15, 2009, which claims priority to Italian Application IT2008BO00566 filed Sep. 16, 2008, each of which is incorporated herein by reference in its entirety.

This invention relates to an agricultural vehicle.

As is well known, agricultural vehicles are large, heavy, self-powered vehicles having (typically) large-diameter, tyred wheels or (sometimes) flexible, ground-engaging tracks. Agricultural vehicles operate primarily in fields and also must be capable of travelling on roads and in farmyards, etc.

Such vehicles have an extremely heavy usage "duty", being frequently expected to operate for many hours at a time while performing tasks such as ploughing, hoeing/other tilling, rolling, harvesting, mowing, towing, dosing, e.g. spraying, of agrochemicals, and planting of seeds. Partly because of this, and also because of the mass, complexity and tyre rolling resistance presented by an agricultural vehicle, such vehicles consume significant amounts of fuel.

Traditionally, liquid diesel fuel has been used to power the internal combustion (i.c.) engines normally provided in agricultural vehicles. It is not unusual for e.g. a tractor working in a field to use up several hundred liters of diesel fuel in a day.

This consumption of hydrocarbon-based fuel has been criticised as being a source of atmospheric carbon dioxide. Carbon dioxide is a so-called "greenhouse gas" the release of which into the atmosphere as a result of human activities is regarded by many scientists as causing or exacerbating climate changes that have been observed in recent years.

It is desirable to reduce the hydrocarbon fuel consumption, and hence the carbon dioxide emissions, of agricultural vehicles. Aside from the obvious benefit from this of simply causing less carbon dioxide to be emitted into the atmosphere, the emissions produced by agricultural vehicles may be important in connection with decisions concerning the production of biofuels.

Biofuel crops are plants that yield hydrocarbon fuels that may be consumed in a variety of machines (including but not limited to vehicle engines).

An aim of the production of biofuel crops is to make their production "carbon-neutral", or even "carbon-negative". In other words, it is desirable that the carbon dioxide emitted during the production of biofuels is no greater than the amount of carbon dioxide absorbed by biofuel plants during growing.

Clearly it is important that any agricultural vehicle used in the production of biofuels and indeed all other types of crop produces as little carbon dioxide as possible in order not to offset the benefits of producing the biofuels in the first place.

According to the invention in a first aspect, there is provided an agricultural vehicle comprising front and rear axle assemblies supported in mutually spaced relation by one or more vehicle frame members that also support a drive train comprising:

a) one or more air compressors;
 b) one or more fuel sources;
 c) a fuel cell comprising one or more fuel cell modules; and
 d) one or more electric motors, that are operatively connected together, the air compressor feeding air to the fuel cell, the or each fuel source feeding fuel to the fuel cell and the electric motors being connected or connectable to the fuel cell such that electrons generated during operation of the fuel cell cause activation of one or more said motors.

The operation of a fuel cell whose fuel is hydrogen produces electrical energy that provides current through an electric circuit, plus air, water, unused hydrogen and heat. No carbon dioxide is produced. Consequently the use of an agricultural vehicle according to the invention would, if its fuel cell is a hydrogen-powered one, contribute little or no atmospheric carbon dioxide as long as the processes that produce the hydrogen on which the vehicle runs are themselves carbon-neutral.

Even if the hydrogen is produced using methods that result in the release of carbon dioxide, use of an agricultural vehicle according to the invention would cause the emission of only about 50% of the carbon dioxide produced overall by an equivalent vehicle having an i.c. engine.

In the past there have been proposals to equip passenger vehicles such as cars and even motorbikes with fuel cell power plants. One factor that may however have caused the acceptance of such vehicles to be slower than predicted is the absence of a large-scale infrastructure having the purpose of providing fuel for the fuel cells at convenient (i.e. roadside) locations.

The usage of an agricultural vehicle however differs from that of e.g. a passenger car because the agricultural vehicle rarely travels a significant distance from a base location (e.g. a farm shed). In consequence it is not necessary to provide an extensive fuel supply network since the vehicle may easily return to the base location for refuelling.

Hydrogen is produced in large quantities by the petrochemical industry, for the purpose of refining oil into gasoline and other products. The supply of hydrogen from such sources e.g. by tanker for the purpose of fuelling an agricultural vehicle may be effected more easily and economically than would be the case for passenger vehicles, not least because many farmyards are easily large enough to accommodate the storage tanks that may be required for the purpose. Additionally it is easy for large tanker vehicles to manoeuvre in many farmyards, thereby facilitating the delivery of fuel.

Preferably the agricultural vehicle includes one or more tanks for fuel for the fuel cell supported by one or more said frame members. One particularly suitable type of tank is an essentially cylindrical one that is manufactured from a carbon fibre material. Carbon fibre is suitable partly because it can be woven and otherwise treated to create a material that is impervious to the passage of hydrogen (that could leak from other types of tank).

Conveniently the agricultural vehicle of the invention includes a said electric motor connected to drive one or more ground-engaging wheels or tracks supported by one or more said axle assemblies.

Various options exist for the configuration of electric motors connected as part of the drive train of the agricultural vehicle. In the case of a wheeled (as opposed to tracked) vehicle these include a single drive motor whose output is split (e.g. by means of a largely conventional differential or transfer box) between multiple wheels that may be on the same axle or different axles.

Another possibility within the scope of the invention is to employ multiple motors. For example there could be provided one motor per axle (driving e.g. two ground-engaging wheels) or one motor per wheel, giving rise to independently controllable four-wheel drive.

Similar options exist in the case of a tracked agricultural vehicle made in accordance with the invention.

Another possibility within the scope of the invention is to provide multiple motors driving the wheels on one axle, and a single, further motor driving the wheels on another axle. Thus it is possible for example to provide an individual motor to drive each of the wheels mounted on the rear axle of the tractor, and a single motor driving both the wheels mounted on the front axle. Other configurations are possible but this one may be particularly preferable since typically it is necessary for the rear axle to the responsible for a major part (eg. 60-70%) of the tractive effort of the vehicle.

The arrangement of the invention is also suitable for use when a tractor includes one or more multiple axles such as double axles. The power output by a single motor may be split between multiple wheels of such an axle; or multiple motors (eg. one per axle or one per wheel) may be provided.

The gaseous fuel when stored in a tank as aforesaid is at a higher pressure than when in the fuel cell. Advantageously therefore the vehicle further includes connected between the said fuel tank and the fuel cell in combination a turbine and generator, the turbine on depressurising of gaseous fuel passing from the fuel tank to the fuel cell rotating to cause the generator to generate electrical energy that is available for further powering the vehicle.

Conveniently the generator is connected or connectable to provide power to one or more ancillary components, as defined herein, and/or electrically powered further sub-systems, also as defined herein, of the vehicle. Consequently the energy released on depressurising of the fuel gas is advantageously utilised to reduce further the overall fuel consumption of the vehicle.

One characteristic of a fuel cell power plant is that the cooling requirement rises in relation to the power plant duty. It follows that the cooling requirement is related to the rate at which fuel is supplied from the one or tanks to the fuel cell.

Advantageously therefore in a preferred embodiment of the invention the gaseous fuel when in at least one said tank is at a higher pressure than when in the fuel cell, the vehicle further including (connected between the said fuel tank and the fuel cell) in combination a turbine and a cooling fan or another component including a rotary shaft, the output shaft of the turbine being coupled to the rotary shaft such that the turbine on depressurising of gaseous fuel passing from the fuel tank to the fuel cell rotating to cause the rotary shaft to rotate and generate a cooling fluid flow. As a consequence of this arrangement the cooling effort may be arranged to vary in dependence on the cooling requirement of the agricultural vehicle.

More preferably the vehicle of the invention may include one or more drive transmission components operatively arranged to interconnect the shaft of the turbine and the rotary shaft; and more preferably still the drive transmission components may define a drive path of a planetary gear set.

Such an arrangement allows the efficient use of de-pressurisation energy created as fuel flows to the fuel cell; and also permits the output shaft of the turbine if desired also to be coupled to eg. a generator or another component.

Although the cooling fan is the preferred component for connection to the turbine output shaft, the mechanical energy available from the turbine may be used to drive any of a range of mechanical devices, if necessary after conversion of the rotary motion of the output shaft to another form.

A significant characteristic of an agricultural vehicle configured as a tractor is its mass. Although in many vehicles a heavy weight is a disadvantage because of its adverse effects on performance criteria such as fuel economy and acceleration, in a tractor heaviness may be important since it improves the traction of the vehicle in wet, muddy or sticky soils.

Furthermore in a tractor a significant proportion of the overall mass, as represented by the engine, is located between front and rear axles. This provides for a good weight distribution both in terms of permitting some of the tractive effort to be contributed by the front axle wheels (when the tractor is a four-wheel drive vehicle), and also in terms of providing stability of the vehicle. Depending on the circumstances of use of the agricultural vehicle, these factors can be very important.

A vehicle that is powered by a fuel cell however typically would be lighter than a comparable vehicle powered by an i.c. engine. This is partly because the fuel cell and related parts are lighter than an i.c. engine of equivalent power output; and also because, depending on the number, type and arrangement of electric motors connected to derive power from the fuel cell, the transmission (another heavy component of a conventional agricultural vehicle) may be simplified or dispensed with entirely.

An agricultural vehicle that is powered by a fuel cell arrangement therefore might exhibit significantly different weight distribution characteristics than a comparable vehicle of conventional design.

In view of this preferably the or each said frame member is elongate and interconnects the front and rear axle assemblies, at least one said vehicle frame member including at least one portion that extends vertically and, protruding therefrom, at least one portion extending horizontally so as to support one or more components of the drive train.

In practice there would be provided two such frame members extending along opposite sides of the vehicle so as to interconnect the axle assemblies. In consequence the components of the drive train specified above may be distributed according to the requirements of the vehicle designer so as to provide weight distribution, and hence vehicle balance, characteristics that are favourable when judged according to the criteria indicated above.

One advantage of the relative lightness of a vehicle made in accordance with the invention is that there is freedom to change the weight distribution by using ballast that may be in the form of releasably securable weight packs such as metal plates that may be bolted to fittings on the vehicle. Therefore the vehicle can be made light eg. when it is required to travel on a road, heavy at the front when carrying an implement on a rear hitch and heavy at the rear when eg. a front loader is fitted. In consequence a vehicle according to the invention needs to be of significant mass only when required, and it may be made lighter (and hence more fuel-efficient) at other times.

Preferably the vehicle according to the invention includes a sub-frame supporting the front wheel axle assembly so as to connect it to one or more said vehicle frame members. This construction differs from that of a conventional agricultural vehicle, in which usually the engine/transmission sub-assembly provides attachment points for the front axle.

In a further, optional refinement of the invention a said electric motor is connected or connectable so as to drive one or more ancillary components of the vehicle. In particular but not exclusively the ancillary components include one or more selected from the list comprising:

a) One or more cooling fans;
b) A cooling water pump;
c) A fuel cell preheater;
d) A power steering pump;
e) A power take-off (PTO) motor;
f) An implement hitch raise/lower drive;
g) A cab air conditioner and/or heater;
h) One or more windscreen wipers and/or washers; and/or
i) One or more hydraulic pumps, The foregoing non-exhaustive list summarises the type of ancillary components that are present in most if not all agricultural vehicles. Obviously if the vehicle is of a specialised kind such as a harvesting machine or a baler there would be further ancillary components. In such cases one or more of the motors may be connected to provide power to such further ancillary components (or parts thereof).

Also conveniently in accordance with the invention the or a said fuel cell is connected or connectable in order to provide electrical power to one or more electrically powered further sub-systems of the vehicle.

The further sub-systems preferably include one or more selected from the non-exhaustive list comprising:
 a) One or more lights;
 b) A radio, CD player, MP3 player, mobile telephone module or other audio/video apparatus;
 c) An information display and/or processing apparatus; and/or
 d) One or more control apparatuses;
 e) One or more electric actuators (for components such as windscreen wipers, electric windows or a cab heating/ventilation system); and/or
 f) A satellite navigation device.

As a result it is possible for the drive train powered by the fuel cell directly or indirectly to drive most or all of the sub-systems of an agricultural vehicle.

In a preferred embodiment of the invention the vehicle includes one or more inverters operatively connected between a said fuel cell and each said motor or sub-system. Inverters commonly are included in fuel cell power systems in order to assist, in a per se known manner, in matching the electrical output of the fuel cell to the requirements and characteristics of any connected load.

In addition to the foregoing the agricultural vehicle of the invention may optionally include one or more electrochemical cells, especially batteries such as Nickel Cadmium (Ni—Cad) batteries, lead acid batteries, nickel metal hydride (NiMH) batteries, sodium sulfur batteries, sodium metal chloride (Zebra) batteries, Lithium ion batteries, lithium polymer batteries, lead-glass batteries and/or aluminium-air batteries, zinc-air batteries that are connected or connectable so as selectively to provide power for one or more said electric motors, one or more ancillary components and/or one or more further sub-systems.

It is possible to configure the electrochemical cells in conjunction with a control apparatus such as a programmable electronic controller so as to permit the selective application of electrical power to various parts of the vehicle. Examples of such usage of the electrochemical cells include the operation of a pre-heater that heats the fuel cell to its operating temperature when the vehicle is started from rest; and the provision of a "power boost" for example when encountering a steep incline or when needing high rates of acceleration during road use. Other applications include energy recovery strategies, examples of which are disclosed herein. For example, electric energy can be recovered by electrically braking the vehicle (ie. so-called "regenerative braking") or by taking back power from auxiliary components (eg. by operating hydraulic pumps in a reverse mode, and/or load "lowering" to recover potential energy, other modes of energy recovery also being possible within the scope of the invention).

The use of electrochemical cells to power a pre-heater may be of particular interest to the vehicle designer since this permits the vehicle to enjoy a rapid start-up procedure even when it has been unused for several hours (such that the fuel cell is below its operating temperature).

In one variant within the scope of the invention the one or more fuel sources include secured to the vehicle an implement or trailer that supports one or more external tanks, for gaseous fuel, that are connected or connectable to supply the fuel cell.

In most versions of the vehicle of the invention the external tank(s) would be auxiliary to fuel tanks that are mounted in the vehicle. In such a case the purposes of the external tank(s) would be:
 i) to provide the extra energy needed, over and above that required to power the vehicle, to operate an implement; and/or
 ii) to increase the time between major re-fuellings of the vehicle and thereby extend its duty period away from a base station.

However it is conceivable, especially if the vehicle is operating in a stationary mode (e.g. to provide power via its PTO shaft to a pump, saw or other stationary, rotary machine), that the external tank(s) could provide the sole source of fuel. In such a case the external tanks could be removed for re-charging with fuel or even for replacement, without having to move the agricultural vehicle.

When the vehicle includes one or more external fuel tanks as aforesaid preferably the gaseous fuel in such an external tank is at a higher pressure than when in the fuel cell, the vehicle further including connected between the or each said external fuel tank and the fuel cell in combination a turbine and generator, the turbine on depressurising of gaseous fuel passing from the external fuel tank to the fuel cell rotating to cause the generator to generate electrical energy.

Conveniently the generator is connected or connectable to provide power to one or more ancillary components, as defined herein, and/or electrically powered further sub-systems, also as defined herein, of the vehicle. Advantages of the foregoing features are similar to those explained above as arising from the presence of a depressurisation generator arrangement powered by fuel stored on the vehicle.

Preferably the generator is connected or connectable to provide power to one or more ancillary components and/or electrically powered further sub-systems of the vehicle. Advantages of this arrangement are similar to those inuring to the connection of a turbine in the fuel line between a fuel tank that is not external of the vehicle and the fuel cell, as explained above.

Conveniently the gaseous fuel when in at least one said external fuel tank is at a higher pressure than when in the fuel cell, the vehicle further including connected between the said fuel tank and the fuel cell in combination a turbine and a cooling fan or another component including a rotary shaft, the output shaft of the turbine being coupled to the rotary shaft such that the turbine on depressurising of gaseous fuel passing from the fuel tank to the fuel cell rotates to cause the rotary shaft to rotate and generate a cooling fluid flow. It is further preferable that the resulting vehicle and external fuel tank combination includes one or more drive transmission components operatively arranged to interconnect the shaft of the turbine and the rotary shaft; and optionally that the drive transmission components define a drive path of a planetary gear set.

Advantages of such arrangements are as set out above.

Various types of fuel cell are known. In the preferred embodiment of the invention the or each fuel cell module is a polymer electrolyte membrane (PEM) module. These fuel cell modules exhibit good chemical stability characteristics, and are easy to handle. Moreover they are powered by hydrogen that, as noted above, is abundantly available. It is however possible to provide other types of fuel cell module within the scope of the invention.

Optionally the vehicle of the invention includes a regenerative braking module operatively connected to one or more ground-engaging wheels or tracks.

Regenerative braking is known per se. In essence it involves the presence of an inductor and magnet combination that when it is required to brake the vehicle operate as a "reverse electric motor" both to provide an electromotive force that decelerates the vehicle and to induce an electric current in a cable. The current may be employed further to reduce the overall energy consumption of the vehicle compared with a conventional one.

In a further, optional refinement the vehicle of the invention may include a display device, a global positioning system (GPS) antenna and decoder; and a processing device, the processing device being configured and/or programmed to calculate the fuel consumption of the vehicle, based on its prevailing usage, and the distance of the vehicle from a predetermined location; and to provide a warning via the display device before the fuel source becomes insufficient to permit the vehicle to return to the predetermined location when operated in accordance with the prevailing usage.

Such a sub-system is useful because of the unique usage characteristics of agricultural vehicles in remaining a comparatively short distance from a base location. The sub-system permits an operator of a vehicle according to the invention to maximise any period of utilisation yet still return to the base location in time to re-fuel the tank(s) with fuel for the fuel cell.

To this end therefore the processing device preferably is configured and/or programmed such that the predetermined location is a farm yard or building containing a fuel supply, or a parked fuel tanker.

The use of a parked fuel tanker confers further flexibility on the use of the vehicle of the invention, since then the base location of the vehicle may in effect be temporarily set, using the processing device, to be the location of the tanker. This means that the vehicle can rove further from e.g. a farmyard than would otherwise be the case. In turn this renders the vehicle suitable for use on very large farms such as those encountered in certain parts of the United States and the Ukraine. The tanker may if desired be equipped with a radio frequency identification device that easily permits the vehicle of the invention to track its location relative to the tanker.

It is anticipated that the agricultural vehicle may be configured as a tractor, combine harvester, forage harvester, beet harvester, loader, multipurpose farm vehicle or mower. Such vehicles may be autonomous in the sense of being driverless and controlled using programmable electronic devices; or they may be of the more familiar kind that requires an operator located in a cab to perform at least some controlling actions.

As indicated above, hydrogen (being the most likely fuel for use in the vehicle of the invention) is readily available from industrial sources.

It is however equally possible that an agricultural vehicle according to the invention could operate on the basis of hydrogen fuel manufactured locally e.g. from methane produced on the farm where the vehicle is located, or at a nearby, small-scale production plant.

In this regard, many farms produce significant quantities of chemicals that can be treated to produce hydrogen. Examples include various forms of biomass that can be heated or fermented; unused animal feedstock; and animal slurry. The fuel that results from processing of such materials may be stored e.g. in farmyard tanks. Alternatively a localised group of farms may collectively store fuel for consumption by members of a co-operative.

In a second aspect therefore the invention includes within its scope an agricultural machinery combination comprising an agricultural vehicle according to the first aspect of the invention defined herein, a supply of gaseous fuel that is external to the vehicle, and a dispensing apparatus for dispensing fuel from the supply to the vehicle, the one or more fuel sources of the vehicle including one or more tank inlets and the dispensing apparatus including one or more supply hoses that are mateable with a said tank inlet so as to permit the dispensing of gaseous fuel to the vehicle.

Conveniently the dispensing apparatus includes a pump or compressor for the gaseous fuel and the vehicle includes one or more power sources for powering the pump or compressor.

Such power sources may be constituted as e.g. one or more PTO shafts, hydraulic lines containing pressurised hydraulic fluid or electrical cables that may be connected to drive an electric pump. Regardless of the precise type of power source, however, it is an advantage of the machinery combination that the vehicle provides the energy for dispensing of the fuel. This permits a re-fuelling station to be located in a rural location where it may otherwise be hard to install power supplies; and enhances the security of storage of the fuel.

Preferably the supply of gaseous fuel is or includes an immobile storage tank; or is or includes a mobile tanker trailer.

In an alternative arrangement, the supply of gaseous fuel includes a gas generator.

In such a case the gas generator may be or may include a converter of agricultural slurry, feedstock or biomass for generating gaseous fuel; or it may be or include an electrochemical converter that electrolyses an electrolyte to produce gaseous fuel.

There now follows a description of preferred embodiments of the invention, by way of non-limiting example, with reference being made to the accompanying drawings in which.

Figure 1:
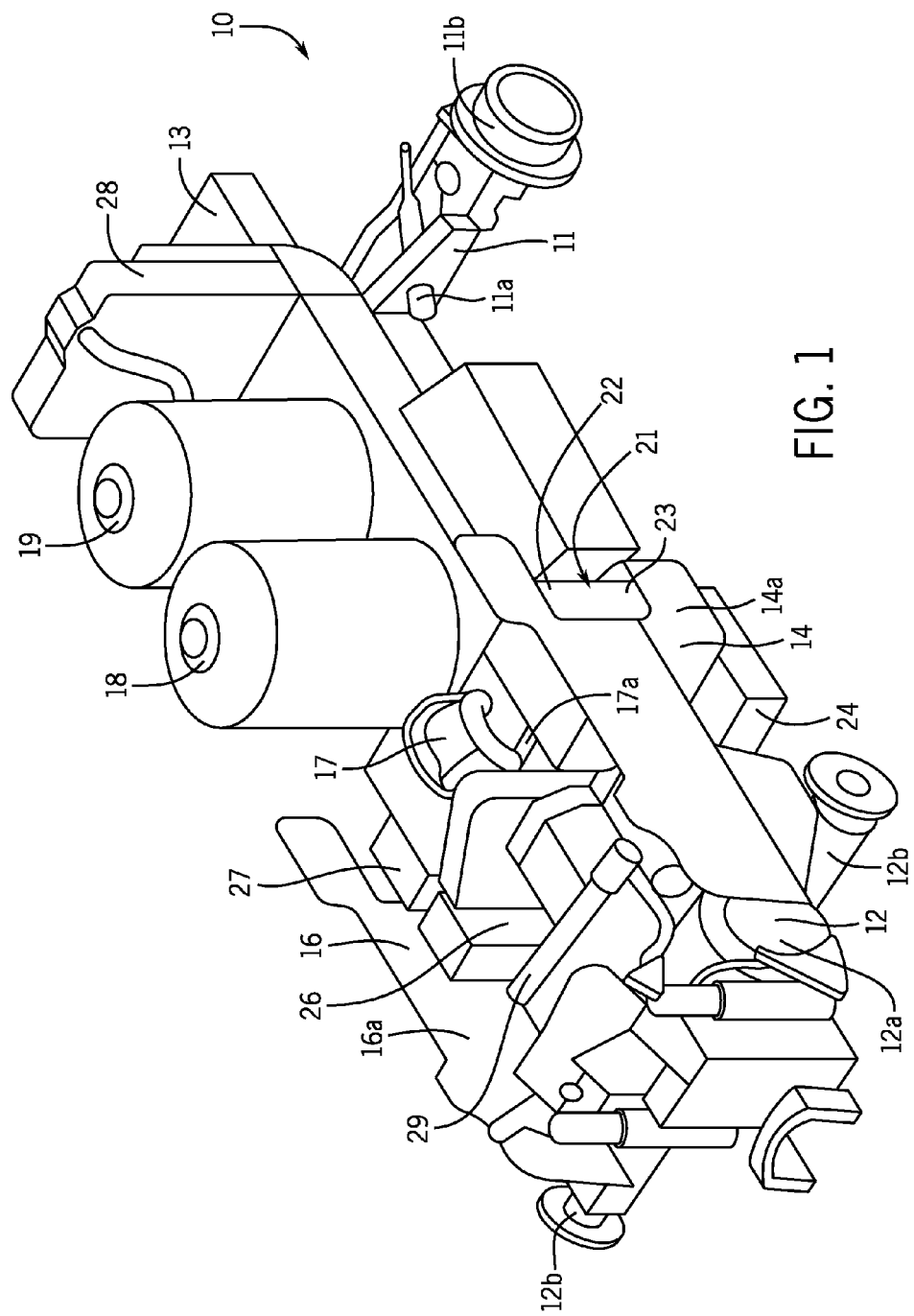
FIG. 1 is a perspective view of the interior of an agricultural vehicle according to the first aspect of the invention.

Referring to FIG. 1 an agricultural vehicle 10 according to the invention is shown in the form of a tractor that is for ease of illustration visible in a partly disassembled state. In particular FIG. 1 omits the wheels and tyres, the engine hood, other body panels and the operator's cab that would normally be present in a tractor.

Vehicle 10 includes front 11 and rear 12 axle assemblies. In the embodiment shown these are largely conventional axle assemblies as would be encountered in a typical prior art tractor.

Consequently front axle assembly 11 includes a cast and machined metal (e.g. iron) beam 11a accommodating a pivoting steering mechanism of a known design. Rear axle assembly 12 includes a cast iron housing 12a containing a differential gear mechanism. Rear axle assembly 12 also is connected to the conventional suspension and damping components that are typically present in agricultural vehicles.

Both the front 11 and rear 12 axle assemblies include stub axles 11b or half-shafts 12b as appropriate for the purpose of rotatably mounting ground-engaging wheel and tyre combinations of the tractor in a per se known manner.

In an alternative arrangement however the wheel and tyre combinations could be replaced by ground-engaging tracks. Embodying the vehicle of the invention in this fashion will be within the ability of the worker of skill in the art.

Regardless of the precise axle arrangement adopted, in accordance with the invention the vehicle 10 includes at least one, and in practice two, frame members 14, 16.

The frame members 14, 16 support the axle assemblies in mutually spaced relation. In the arrangement shown a respective, elongate frame member 14, 16 extends along each side of a lower region of the vehicle 10 just above the axle assemblies that therefore are underslung relative to the frame members. The front axle assembly 11 is connected to the frame members by way of a sub-frame 13 whereas the rear axle assembly 12 is connected to the frame members by means of the suspension/damping components mentioned above.

In alternative embodiments of the invention the precise attachment arrangement of the axle assemblies may differ from the versions shown in FIG. 1.

In the region between the axle assemblies 11, 12 the frame members support a drive train comprising an air compressor 17; a fuel source in the form of a pair of hydrogen tanks 18, 19; a fuel cell 21 comprising (in the embodiment shown) three hydrogen fuel cell modules 22, 23, 24; and a pair of electric motors 26, 27.

The air compressor 17 is electrically powered and is connected by way of a hose and connector combination 17a to provide compressed air to the cathode side of hydrogen fuel cell 21.

The hydrogen tanks 18, 19 contain fuel for the fuel cell 21 in the form of compressed hydrogen that is at a pressure of roughly 200-350 bar, the precise pressure being dictated by the requirements of the fuel cell 21. Since Hydrogen is constituted by the smallest atom known it is necessary to store the hydrogen fuel for the cell 21 at a high degree of compression in order to achieve an adequate fuel density.

In the embodiment of the vehicle shown in FIG. 1 the tanks 18, 19 (whose preferred constructional details are discussed below) are shown as two upright, woven carbon fibre cylinders located side-by-side.

In other embodiments of the invention the tanks 18, 19 may be lain horizontally or in another orientation, and need not be located side-by-side as shown. Moreover the tanks need not adopt the cylindrical shapes illustrated, although this design is beneficial from the standpoint of the strength of the tanks and their ability to resist leakage of hydrogen at the high pressures mentioned. If non-cylindrical shapes are employed it is possible for the tanks to conform to the shapes of spaces inside the body of the agricultural vehicle 10.

The number of the tanks also need not be limited to the two illustrated, and greater or fewer tanks are possible within the scope of the invention.

Regardless of the exact tank arrangement however it is important that the tanks 18, 19 are connected by way of hoses or pipes to supply hydrogen to the anode side of fuel cell 21. Appropriate hose unions, the designs of which are known in the art, may be employed as part of such an arrangement.

On operation of the fuel cell 21, as is well known, the reduction of hydrogen releases electrons. These are conveyed by appropriate electrical cabling to (in the embodiment illustrated) two electric motors 26, 27 whose functions are described in more detail below.

Several philosophies, however, are possible in relation to the utilisation of electric power generated by the fuel cell 21.

For example, it may be desired in one embodiment of the invention to provide a single electric motor having eg. a rotary output shaft from which drive for the vehicle wheels and power for driving ancillary components may be drawn.

As indicated, in the preferred embodiment of the invention there are two motors. One of them, labelled 26, provides drive for the vehicle wheels; and the other, 27, provides power for driving ancillary components of the vehicle.

In yet a further variant within the scope of the invention it is possible for example to provide an electric motor at each of the four wheels of a wheeled agricultural vehicle. When provided in combination with control electronics the result is an agricultural vehicle having independently controllable four wheel drive. For certain applications such as ploughing there may be distinct benefits to the provision of such an arrangement. Furthermore the provision of independently controllable four wheel drive in this fashion may permit the vehicle designer to simplify very dramatically or even dispense entirely with complex components of an agricultural vehicle such as differential gears and various transmission shifting components.

As a result of the precision of control available the use of multiple electric motors arranged in the ways described above improves the "driveability" of the vehicle compared with the option of splitting the output of a single motor.

Furthermore an arrangement in which there is one motor per wheel greatly improves the maneuverability of the vehicle, since it then becomes possible for the vehicle to turn without advancing forwardly or rearwardly. This is achievable through the use of a control law that allows the wheels (or tracks, if fitted) on opposite sides of the vehicle to be driven in opposite directions in order in effect to slow the vehicle "on the spot".

The fuel cell 21 of the preferred embodiment as explained comprises three fuel cell modules 22, 23 and 24, producing a total power output of about 75 kW, supported in a stack. It is not essential however that the modules 22, 23 and 24 are located adjacent one another in the vehicle. Moreover more or fewer modules, producing the same or different power outputs, may be employed if desired.

In any event, operation of the fuel cell 21 causes powering of the motors 26, 27 in order to provide for operation of the vehicle.

As indicated above, the hydrogen fuel in the tanks 18, 19 supported by the frame members 14, 16 is stored at a moderately high pressure that might be in the range 200-350 bar. This is a considerably higher pressure than that at which the hydrogen fuel is utilised in the fuel cell 21. Consequently it is necessary during use of the vehicle 10 to de-pressurise the hydrogen.

This may be achieved for example through the use of a one-way valve located in the pipework interconnecting the hydrogen tanks 18, 19 at the fuel cell 21. A more sophisticated arrangement, within the scope of the invention, however, would additionally include, installed in-line in the pipework, a turbine. For clarity the turbine is omitted from FIG. 1, but it could take any of a range of forms. The main point of the turbine would be to recover energy caused by de-pressurisation of the hydrogen. To this end the turbine would include a rotary output shaft (preferably) connected to a generator (eg. a DC generator) for the purpose of further providing electrical power for use in the vehicle 10. Such a generator may advantageously be connected or connectable to provide power to one or more ancillary components and/or electrically powered further sub-systems of the vehicle. Examples of ancillary components and further sub-systems are set out hereinabove. The turbine can drive a mechanical device directly coupled to it. An example is a cooling fan 28 having a rotary input shaft.

A characteristic of a hydrogen fuel cell is that the more hydrogen is taken from the tank, the more power is generated and the more cooling effort is required. Therefore a cooling fan directly or partially (by means of a power split based on a planetary gear set) actuated by hydrogen depressurization will increase/decrease its speed automatically according to the generated power.

Included in the list of ancillary components given above are a cooling fan and cooling water pump. The cooling fan is identified in FIG. 1 by reference numeral 28. Cooling fan 28 may be of a conventional design known in the art.

As is evident from FIG. 1, frame members 14, 16 are elongate and each extend along opposite sides of vehicle 10 from a location near the rear of it towards the front end.

Each of the frame members 14, 16 includes a part 14a, 16a that extends vertically as a side wall; and one or more horizontally extending shelves (that are not visible in FIG. 1).

The shelves provide support from underneath for the various drive train components described above.

As explained, the use of elongate frame members 14, 16 that are capable of supporting the drive train components in a distributed fashion about the interior of the vehicle 10 allows the designer of the vehicle to specify the distribution of weights in the vehicle.

This in turn allows fine-tuning of, for example, the position of the centre of mass of the vehicle and the location of the polar moment of inertia.

Various electrical control components are needed in order to condition the electrical output from the fuel cell for use in the motors 26, 27. Such components include a resistor 29 and one or more inverters that convert the DC output of the fuel cell 21 to alternating current. FIG. 1 omits the inverters for clarity. Several designs of these components are known.

In addition, as an optional feature, the vehicle 10 may include one more electrochemical cells in the form of batteries. These are connectable so as selectively to provide power for one or more of the electric motors of the vehicle, one or more ancillary components or one or more further sub-systems as set out herein.

One embodiment of the invention utilises such electrochemical cells (batteries) in order to provide a short-term power boost for the vehicle 10. This may be desirable for example when the vehicle encounters a slope and the operator (or control software embodied within the vehicle) wishes to maintain the same work rate as when operating on flat ground. Another example of a power boost being useful is during road use of the agricultural vehicle 10.

In the latter regard, agricultural vehicles as is well known are generally extremely heavy. This adversely affects their ability to accelerate from rest. This can be a particularly significant consideration for example when emerging at road junctions since other road users may misjudge the ability of a tractor to move out of an intended line of travel. The presence of power boost batteries can be of considerable assistance at such a time.

In the alternative, batteries may be used to power subsystems such as the air conditioner or various communication apparatuses of the vehicle. If the batteries are of a re-chargeable kind, they can be re-charged using electricity generated by the fuel cell 21 or a regenerative braking system, or a de-pressurisation turbine, for example during periods when the usage duty of the agricultural vehicle is low.

As an example of this, a tractor consumes considerably more energy when ploughing then when being driven on a road. The electrochemical cells could be re-charged during the latter operation, so that the batteries are available for use when required at other times.

In a further refinement of the concepts of the invention disclosed herein, it is possible to provide one or more tanks for fuel for the fuel cell 21 supported on a implement or trailer connected to be towed or pushed by vehicle 10.

When the vehicle 10 is embodied as a tractor, typically at least two attachment points would be provided (ie. the front hitch and rear three-point hitch). Implements or trailers connected to such hitches could readily incorporate tanks such as tanks 18, 19 shown in FIG. 1. Flexible hoses and connectors could then be provided for the purpose of feeding fuel from such tanks to the fuel cell 21.

In one mode of use of the vehicle 10 in this fashion, the implement-mounted hydrogen tanks could provide hydrogen fuel that generates the power needed to operate the implement.

In other words, in accordance with the invention the implement would support its own fuel source. This is efficient since in that case the vehicle 10 would not need to transport fuel to power the implement except at times when it is desired to operate the implement.

Another mode however of using the trailer- or implement-mounted tanks described above involves dispensing with the tanks 18, 19 that are present on the vehicle.

Such an arrangement could provide advantages in terms of security of the vehicle 10 and management of fuel supplies and the utilisation of trailers, implements and other accessories. In this regard, clearly the vehicle 10 could only be driven while attached to the implement or trailer, thereby limiting its use. There could arise circumstances under which such an arrangement is desirable.

The preferred form of fuel cell module 22, 23, 24 is a so-called polymer electrolyte membrane (PEM) module. Such a fuel cell module is advantageous in several respects.

Firstly the module is robust both in physical terms and in terms of its resistance to chemical degradation. This is important, considering the harsh use to which agricultural equipment generally is put.

PEM fuel cell modules include a solid electrolyte. This also is beneficial since the fuel cell modules operate regardless of their orientation. In consequence the designer of a vehicle 10 in accordance with the invention is able to locate the fuel cell modules at any advantageous position and orientation within the vehicle having regard to factors such as weight distribution as discussed above.

Furthermore the presence of a solid electrolyte means that the performance of the fuel cell modules does not degrade even when the vehicle 10 is driven over uneven or bumpy ground.

If desired the vehicle 10 may include a regenerative braking module that is operatively connected to one or more ground-engaging wheels or tracks of the vehicle.

Regenerative braking systems are well known in themselves. In essence they provide for braking of a vehicle wheel through the induction of an electromotive force. This process generates electrical current that may be transmitted for example to one or more rechargeable batteries forming part of the vehicle 10.

The braking duty of a tractor or other agricultural vehicle may not be as great as that of a passenger car, the speed of which requires constant adjustment to take account of road conditions. On the other hand, under some circumstances (for example when ploughing downhill on a sloping field) regenerative braking could be positively advantageous in not only providing energy for the vehicle 10 but also in assisting to control its speed accurately at a desired level.

The vehicle 10 may include a GPS system antenna and decoder, and a processing device. Indeed, it is commonplace for agricultural vehicles to include such components.

The processing device could be programmed for example to calculate the fuel consumption rate of the vehicle and thereby establish whether the vehicle has enough fuel to return to a base station including refuelling equipment. In the event of the vehicle range approaching a threshold value indicative of a likely inability to return to the base location the processing device could emit a warning via a display device prompting an operator of the vehicle 10 either to return to the base location or to send a message calling for replenishment of the fuel sources.

The base location could be a farmyard, a vehicle shed or a tanker that may be parked eg. at the edge of a large field. The tanker may if desired be equipped with a transponder device such that the vehicle 10 may readily calculate its distance from it. In an alternative arrangement however the transponder is not needed since the location of the trailer, etc. can simply be stored in a mapping system that is connected to the GPS apparatus.

As indicated hereinabove, the vehicle 10 may be configured in a range of ways as eg. a tractor, combine harvester, beet harvester, forage harvester, loader, multi-purpose farm vehicle or mower. Such vehicles have varying numbers of ancillary components and sub-systems. The number and type of electric motors and indeed of fuel cell modules and fuel sources may be adjusted during the design of such vehicles in order to suit the precise requirements.

Figure 2:
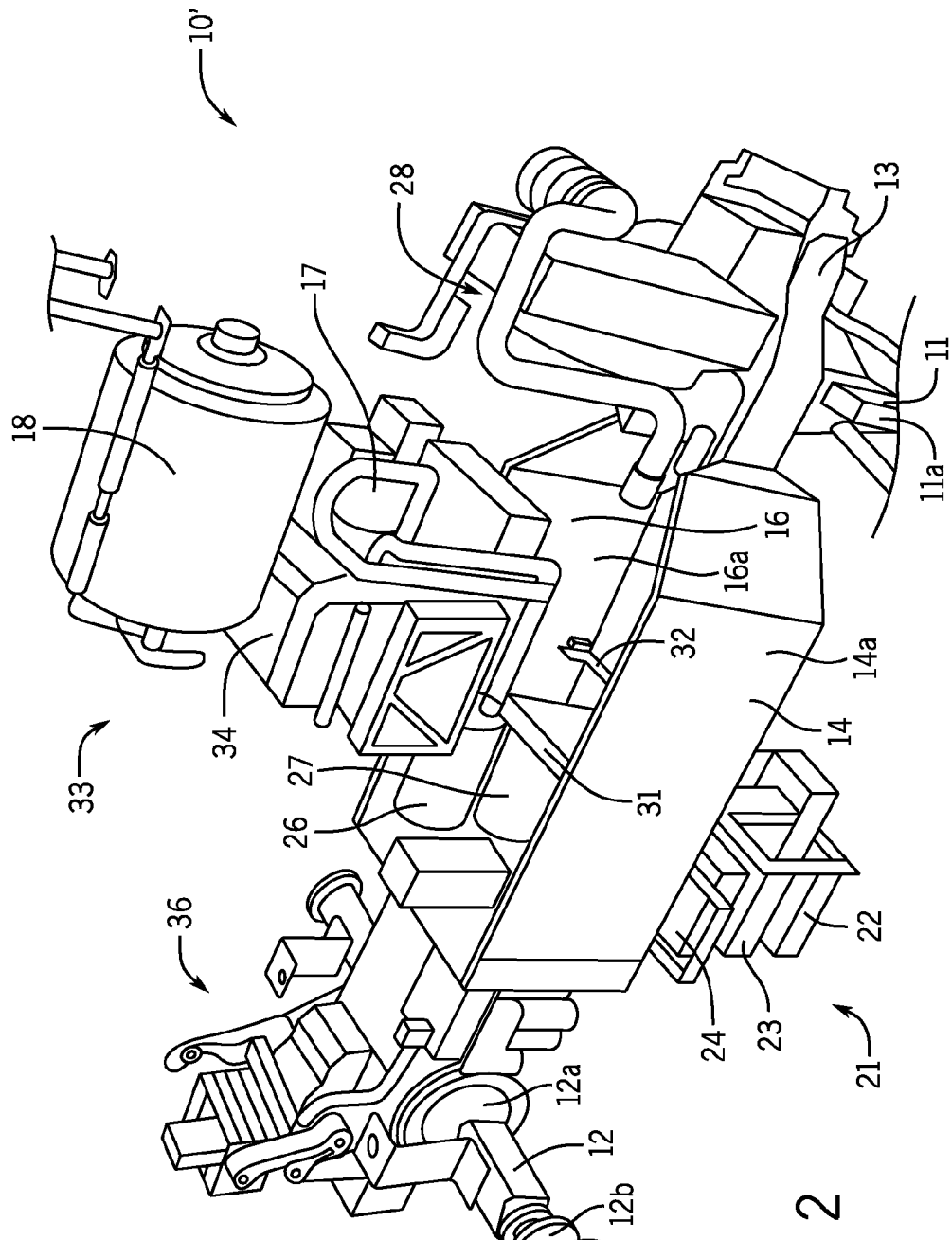
FIG. 2 is a perspective, partly exploded view of the internal components of another agricultural vehicle according to the invention, showing an alternative layout.

FIG. 2 shows a partly exploded, perspective view of another agricultural vehicle 10', that is also a tractor, according to the invention.

In FIG. 2 the same numerals are used as in FIG. 1 to identify counterpart components.

FIG. 2 shows among other features a variant shape of the frame members 14, 16 and a single hydrogen fuel tank 18 that is a horizontal cylinder.

FIG. 2 also illustrates a pair of shelf or strut members 31, 32 that extend horizontally so as rigidly to interconnect the frame members 14, 16. The members 31, 32 rigidify the vehicle 10 in the region intermediate the axles 11, 12 and provide suspension or other support locations for on the one hand the fuel cell 21 and on the other a module 33 comprising the fuel tank 18, compressor 17 and related components such as the inverter that is labelled with numeral 34.

The suspension parts for the rear axle 12 are identified generally by numeral 36 in FIG. 2.

Although the FIG. 2 vehicle is broadly similar in layout to the FIG. 1 vehicle, as explained above this need not be so. Indeed an enormous range of variants of the locations, sizes and exact nature of the various parts of the vehicle is possible within the scope of the invention.

Figure 3:
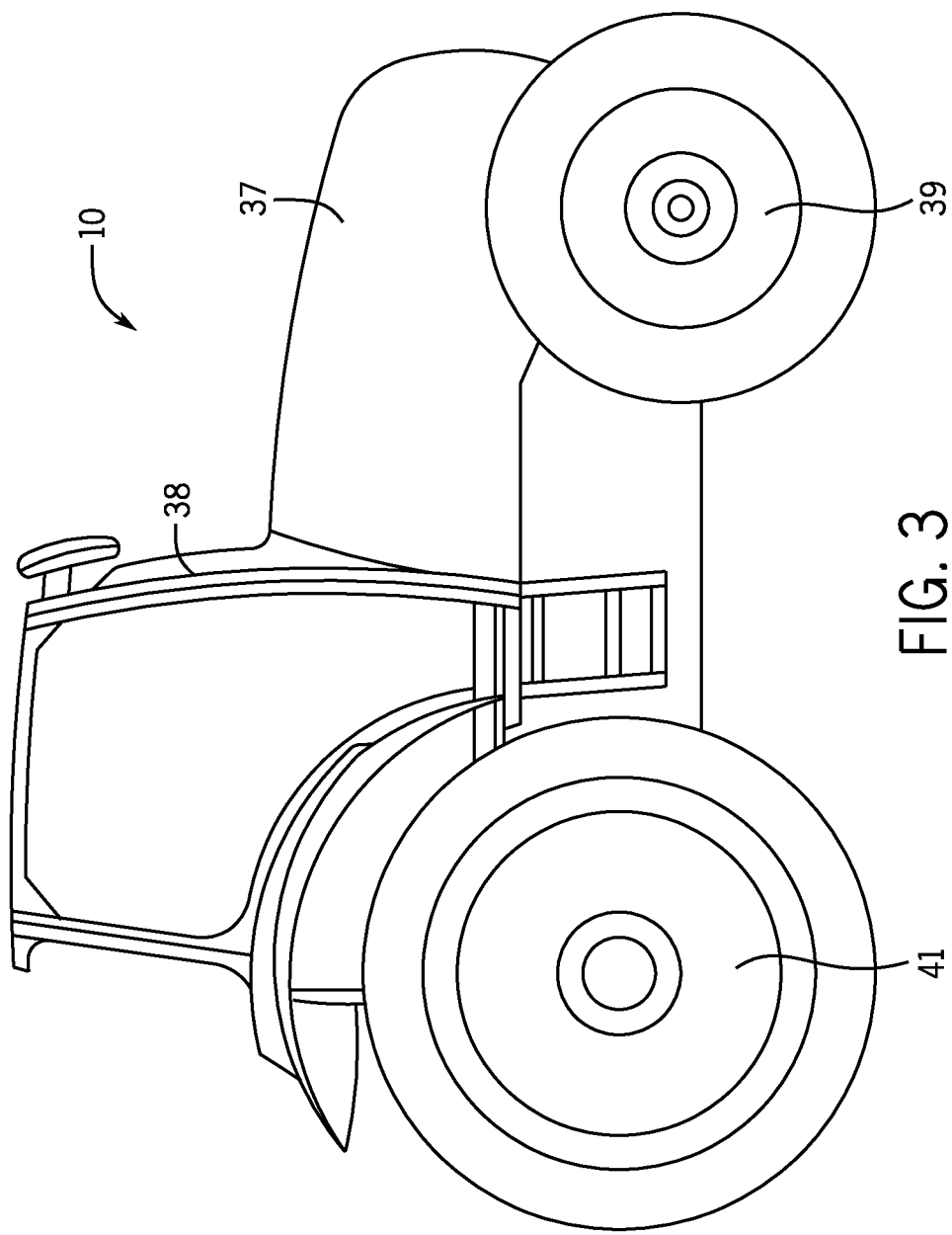
FIG. 3 is a perspective view of a vehicle of the kind shown in FIGS. 1 and 2, showing how an operator's cab, engine hood and ground-engaging wheels may be configured in an embodiment of the invention.

FIG. 3 shows schematically how an engine hood 37 (including ancillary components such as lights and washers therefor) an operator's cab 38 and wheel/tyre combinations 39, 41 may be arranged in accordance with one embodiment of the invention.

The cab 38 would contain the various components and sub-systems normally needed to control a vehicle such as the tractor illustrated and to provide for the comfort of the vehicle operator. In the embodiment of FIG. 3 the cab and hood are largely of conventional design since such arrangements have been found to be highly successful, especially when considering aspects such as visibility.

The agricultural vehicle 10 of the invention however as indicated confers on the vehicle designer very considerable freedom over the locations of various internal parts. This opens up the possibility of designing within the scope of the invention a vehicle 10 whose appearance differs dramatically from that of a conventional tractor, harvester, loader, etc.

Figure 4:
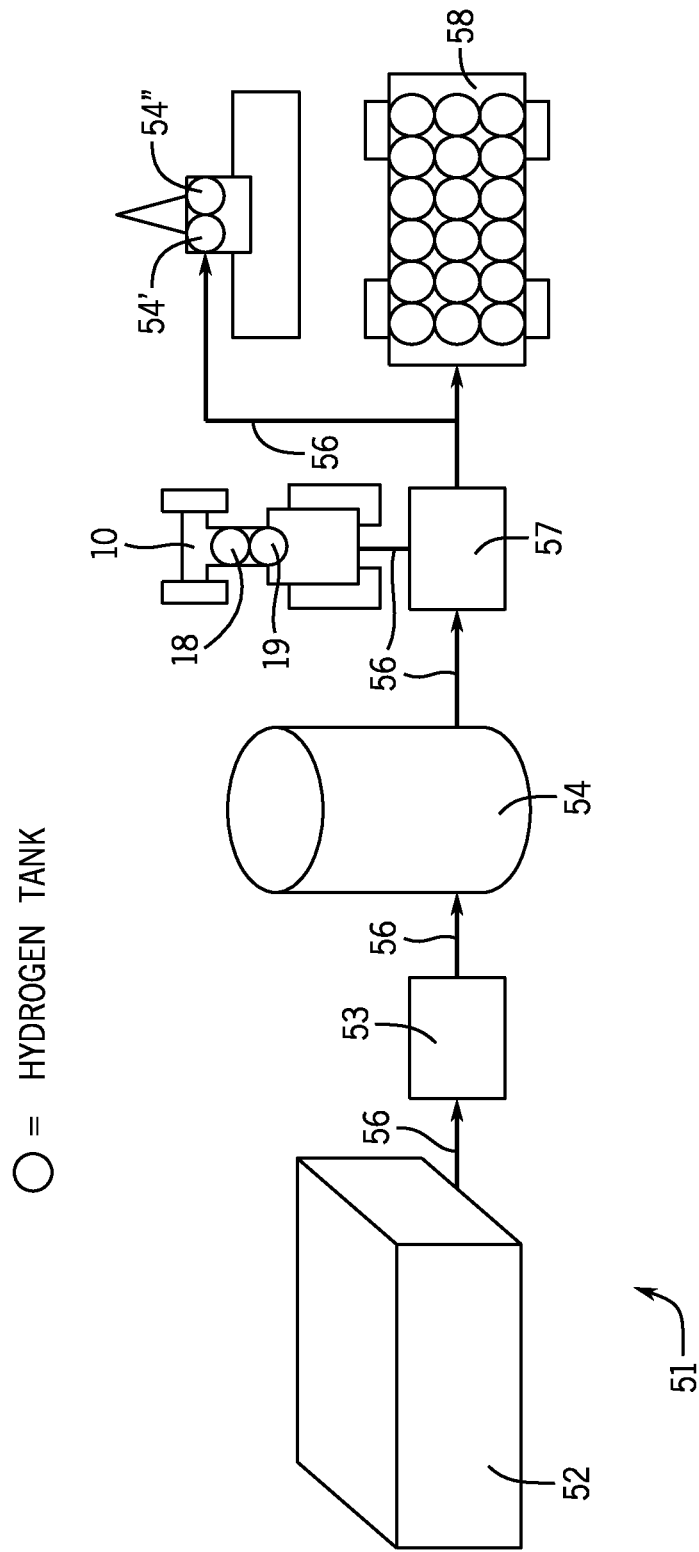
FIG. 4 is a schematic view of an agricultural machinery combination according to the second aspect of the invention.

FIG. 4 shows in schematic form a simple combination, according to the invention, of a vehicle such as the vehicles 10 described herein and a gaseous fuel supply 51 that is external to the vehicle 10.

The fuel supply 51 includes a hydrogen or other fuel gas converter 52 that may be of any of the types described herein.

When as in the preferred embodiment the converter 52 is configured to generate hydrogen the fuel supply 51 also includes a compressor 53 and a hydrogen storage tank 54.

Hydrogen fuel is conveyed between the various components 52, 53, 54 by way of hoses 56 and connectors the nature of which will be known to those of skill in the art.

Similar hoses 56 may be used for the purpose of supplying hydrogen to the tanks 18, 19 of a vehicle 10, by way of one or more tank inlets that are not visible in FIG. 4.

FIG. 4 includes an optional further compressor 57 intermediate tank 54 and vehicle 10 that may be used further to compress the fuel. This in turn permits the conveyance of fuel via pipes or hoses 56 eg. to one or more remotely located tanks 54', 54" (that may constitute a "field" fuelling station at which a vehicle 10 may re-fuel) and/or a tanker trailer 58 of the kind described hereinabove. Trailer 58 is shown as including a plurality of individual tanks, but this need not necessarily be so.

The key in FIG. 4 signifies the individual fuel tanks such as tank 18. The same key applies in FIG. 5 described below.

Figure 5:
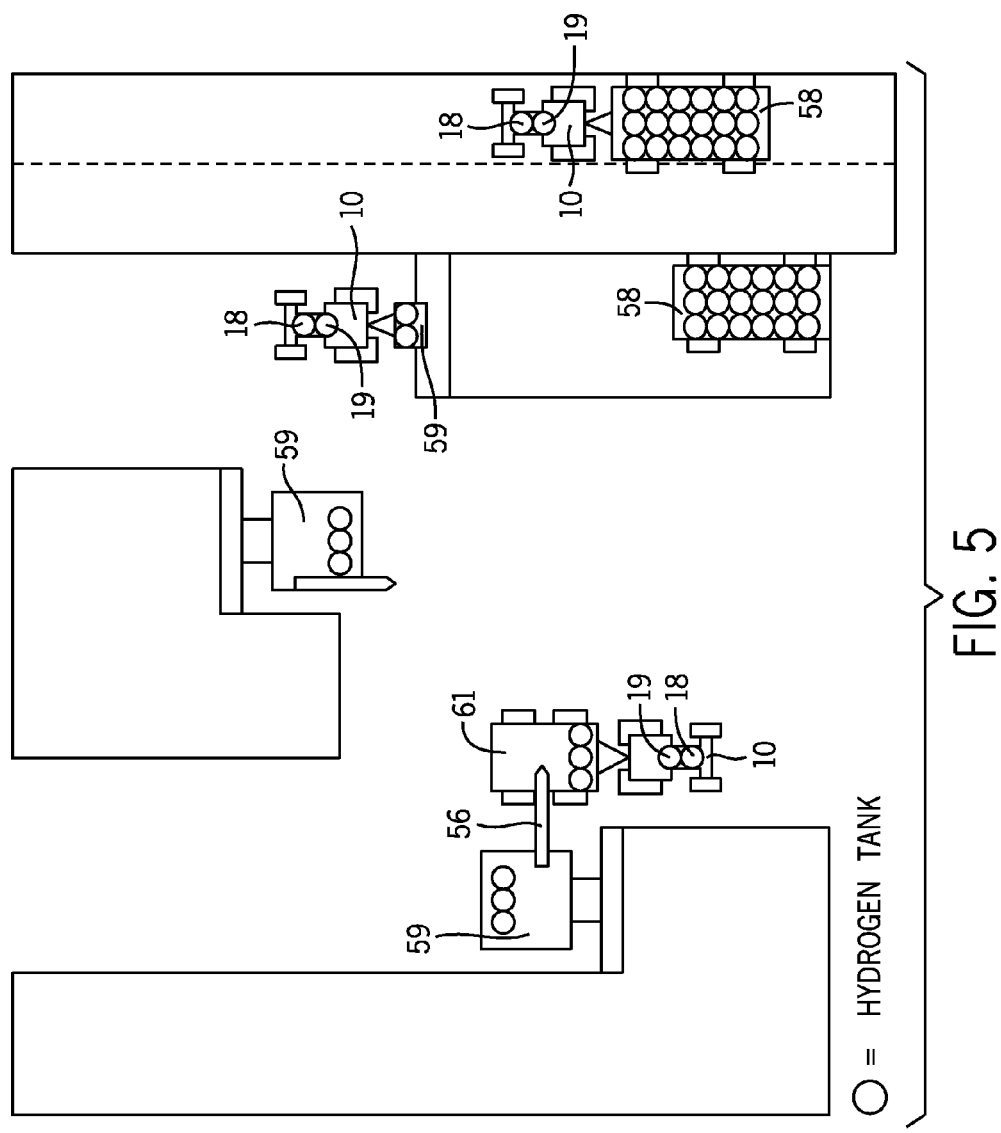
FIG. 5 shows in schematic form how a combination such as that shown in FIG. 4 may be incorporated into a farmyard or a local fuelling station in accordance with the invention.

In FIG. 5 there is shown in schematic form a multi-vehicle fuelling station. As mentioned this may be constituted in a farmyard or at a depot operated eg. by a fuel co-operative consisting of several localised agriculture businesses.

In FIG. 5 a plurality of fuelling stations 59 are visible. These may be supplied with fuel by one or more converters such as converter 52 of FIG. 4; by one or more tanker trailers 58 that may be delivered from a remote location charged with fuel; or by a combination of methods.

The fuelling stations 59 include hoses and the vehicles 10 tank inlets or adapters that permit the safe transfer of gaseous fuel.

FIG. 5 additionally shows a towed implement 61 that includes a plurality of the tanks for gaseous fuel. As explained, implement 61 may be arranged to carry fuel that powers its own operations; or even fuel for powering part or all of the functioning of the vehicle 10 that tows it.

The base location includes a supply of fuel (hydrogen) such as a series of underground or above-ground tanks that contain hydrogen for filling into the tanks 18, 19 of the vehicle 10 or other tanks as described hereinabove.

The base location additionally may include a dispensing apparatus such as flexible hoses 56 and hose connectors that may be used during refilling of the tanks 18, 19, etc.

Furthermore the base location may include a pump or compressor 57 for compressing the hydrogen to the pressure at which it is stored in the tanks 18, 19; and a power source (eg. a generator or indeed a further fuel cell) for powering the pump/compressor.

Such a power source may additionally include a power take-off that may be embodied eg. as a rotary shaft; or a hydraulic power circuit that is mounted on the vehicle 10. The vehicle in such a case therefore would provide the power needed for dispensing fuel for re-filing of the tanks 18, 19. Such an arrangement would be advantageous since then the fuelling apparatus at the base location would not require a dedicated power supply (that instead would be provided by the vehicle 10). Such an arrangement additionally enhances the security of storage of the fuel.

As indicated, the gaseous fuel supply at the base location may be a series of permanently installed tanks. In alternative arrangements, however, mobile tanker trailers could be employed, or gas generators. These may include electrochemical converters that electrolyse an electrolyte to produce gaseous fuel and/or a combustion or fermentation converter of agricultural slurry or biomass for the purpose of generating fuel that, as indicated, in a typical case would be hydrogen.

What is claimed is:

1. An agricultural vehicle comprising front and rear axle assemblies supported in mutually spaced relation by one or more vehicle frame members that also support a drive train comprising:
    one or more air compressors;
    one or more fuel sources, including one or more tanks for gaseous fuel supported by the one or more frame members;
    a fuel cell comprising one or more fuel cell modules; and
    one or more electric motors, that are operatively connected together, the air compressor feeding air to the fuel cell, each fuel source feeding fuel to the fuel cell and the electric motors being connected to the fuel cell such that electrons generated during operation of the fuel cell cause activation of the one or more electric motors, wherein the gaseous fuel when in at least one tank is at a higher pressure than when in the fuel cell, the vehicle further including connected between the at least one tank and the fuel cell in combination a turbine and generator, and a cooling fan positioned over a portion of the front axle assembly such that the cooling fan is positioned in one of the following configurations: (a) spaced-apart on one side of the one or more tanks with at least one air compressor positioned on an opposite side of the one or more tanks, or (b) spaced-apart from one or more tanks and one or more air compressors, such that at least one tank is positioned above at least one air compressor, and both the at least one tank and at least one air compressor are positioned above the one or more electric motors, the cooling fan including a rotary shaft coupled to the turbine, wherein the turbine rotates on depressurizing of gaseous fuel passing from the at least one tank to the fuel cell causing the rotary shaft and the cooling fan to rotate and to generate a cooling fluid flow, wherein the speed of rotation of the rotary shaft automatically adjusts according to the generated power.

2. The agricultural vehicle according to claim 1 wherein the one or more electric motors are configured to drive one or more ground-engaging wheels or tracks supported by one or more axle assemblies.

3. The agricultural vehicle according to claim 2 wherein the turbine rotates to cause the generator to generate electrical energy.

4. The agricultural vehicle according to claim 3 wherein the generator is configured to provide power to one or more ancillary components or electrically powered sub-systems of the vehicle.

5. The agricultural vehicle according to claim 1 including one or more drive transmission components configured to interconnect an output shaft of the turbine and the rotary shaft.

6. The agricultural vehicle according to claim 5 wherein the one or more drive transmission components define a drive path of a planetary gear set.

7. The agricultural vehicle according to claim 1 wherein the one or more vehicle frame members comprise opposed elongated members each interconnecting the front and rear axle assemblies, each of the elongated members including at least one portion that extends vertically and, protruding therefrom, at least one portion that extends horizontally so as to support one or more components of the drive train, wherein at least one of the one or more tanks and the fan are located within a hood portion of the vehicle above the elongated members and at least one of the compressors and fuel cell modules are positioned below the at least one of the one or more tanks and hood between the elongated members.

8. The agricultural vehicle according to claim 1, wherein at least one of the one of more electric motors is configured to drive one or more ancillary components of the vehicle, and the ancillary components include one or more selected from the list comprising:
    a) the cooling fan or another cooling fan within the agricultural vehicle;
    b) A cooling water pump;
    c) A fuel cell preheater;
    d) A power steering pump;
    e) A power take-off (PTO) motor;
    f) An implement hitch raise/lower drive;
    g) A cab air conditioner and/or heater;
    h) One or more windscreen wipers and/or washers; and/or
    i) One or more hydraulic pumps.

9. The agricultural vehicle according to claim 1 wherein the fuel cell is configured to provide electrical power to one or more electrically powered sub-systems of the vehicle.

10. The agricultural vehicle according to claim 1 wherein a towed implement is connected to the vehicle and supports one or more ancillary external tanks for gaseous fuel, wherein the ancillary external tanks are connected to supply the gaseous fuel to the fuel cell and the gaseous fuel provides power for operating the towed implement.

11. The agricultural vehicle according to claim 10 wherein gaseous fuel when in at least one external tank is at a higher pressure than when in the fuel cell, the vehicle further including connected between the at least one external fuel tank and the fuel cell in combination an ancillary turbine and generator, the ancillary turbine on depressurizing of gaseous fuel passing from the at least one external fuel tank to the fuel cell rotating to cause the generator to generate electrical energy.

12. The agricultural vehicle according to claim 11 wherein the generator is configured to provide power to one or more ancillary components or electrically powered sub-systems of the vehicle.

13. The agricultural vehicle according to claim 1 further comprising a display device, a global positioning system (GPS) antenna and decoder, and a processing device, wherein the processing device is configured to calculate the fuel consumption of the vehicle based on its prevailing usage, to calculate the distance of the vehicle from a predetermined location, and to provide a warning via the display device before the fuel source becomes insufficient to permit the vehicle to return to the predetermined location when operated in accordance with the prevailing usage.

14. The agricultural vehicle according to claim 1 wherein the vehicle is a tractor, combine harvester, forage harvester, beet harvester, loader, multipurpose farm vehicle or mower.

15. The agricultural vehicle of claim 1 in combination with a supply of gaseous fuel that is external to the vehicle and a dispensing apparatus for dispensing fuel from the supply to the vehicle, the one or more fuel sources of the vehicle including one or more tank inlets and the dispensing apparatus including one or more supply hoses that are mateable with the one or more tank inlets so as to permit the dispensing of gaseous fuel to the vehicle.

16. A combination according to claim 15 wherein the dispensing apparatus includes a pump or compressor for the gaseous fuel and the vehicle includes one or more power sources for powering the pump or compressor.

17. The combination according to claim 16 wherein the one or more power sources on the vehicle include a power take-off or hydraulic hose connection.

* * * * *